US006925093B2

(12) United States Patent
Shimizu

(10) Patent No.: US 6,925,093 B2
(45) Date of Patent: Aug. 2, 2005

(54) COMMUNICATION APPARATUS, COMMUNICATION SYSTEM AND METHOD FOR INTEGRATING SPEECH AND DATA

(75) Inventor: Takao Shimizu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 829 days.

(21) Appl. No.: 09/740,238

(22) Filed: Dec. 18, 2000

(65) Prior Publication Data

US 2001/0032082 A1 Oct. 18, 2001

(30) Foreign Application Priority Data

Apr. 14, 2000 (JP) ....................................... 2000-113025

(51) Int. Cl.[7] .................................................. H04J 3/22

(52) U.S. Cl. ....................... 370/468; 370/474; 370/470; 370/471; 370/494; 370/495

(58) Field of Search ................................ 370/468, 470, 370/471, 474, 494, 495

(56) References Cited

U.S. PATENT DOCUMENTS 4,679,191 A * 7/1987 Nelson et al. .............. 370/355
5,142,532 A * 8/1992 Adams ....................... 370/432
5,164,938 A * 11/1992 Jurkevich et al. ........... 370/231
5,524,007 A * 6/1996 White et al. ................ 370/419
6,070,201 A * 5/2000 Tanaka et al. ................ 710/52
2002/0099881 A1 * 7/2002 Gugel ......................... 710/26

FOREIGN PATENT DOCUMENTS

JP 09-097816 2/1999
JP 11252249 9/1999

* cited by examiner

*Primary Examiner*—Wellington Chin
*Assistant Examiner*—Mark A Mais
(74) *Attorney, Agent, or Firm*—Katten Muchin Zavis Rosenman

(57) ABSTRACT

A communication apparatus, communication system, and method for integrating speech and data for performing high-quality communication by integrating speech and data efficiently are provided. A frame controlling section integrates speech frames, being speech signals made into frames, and data frames, being data made into frames, into integrated frames and controls the routing of speech frames, data frames, and integrated frames. An input processing section stores and manages at least one of the three types of frames of speech frames, data frames, and integrated frames. An output processing section stores and manages frames transferred, sets a bandwidth ratio of frames dynamically, and transmits speech frames, data frames, and integrated frames from on lines.

29 Claims, 10 Drawing Sheets

COMMUNICATION APPARATUS, COMMUNICATION SYSTEM AND METHOD FOR INTEGRATING SPEECH AND DATA

BACKGROUND OF THE INVENTION (1) Field of the Invention

This invention relates to a communication apparatus, communication system, and method for integrating speech and data and, more particularly, to a communication apparatus for communicating by integrating speech and data, communication system for communicating by integrating speech and data, and method for integrating speech and data for communicating by integrating and controlling speech and data.

(2) Description of the Related Art

In recent years, in addition to conventional centralized telephone switching service, the use of high-speed transmission via distributed LAN for local communication is increasing. As a result, intranet communication is widely performed. Conventionally, installations for such an in-house PBX network and intranet have been constructed separately from each other because of their difference in protocol. Conventionally, a public telephone trunk network and internet trunk network have also been installed separately from each other.

A telephone network and data network are installed separately from each other in this way, resulting in low installation efficiency. Furthermore, lines are used separately, resulting in low efficiency in the use of lines.

To take an example of conventional techniques, Japanese Patent Laid-Open Publication No.Hei 11-252249 discloses a switching system for exchanging frames, being speech made into MAC frames, and LAN data in order to realize communication in which telephone speech and data are integrated.

In recent years, on the other hand, Internet telephone for performing speech communication via Internet has appeared. It uses voice over IP (VoIP) technique in order to realize speech communication on an IP network.

The above conventional technique, however, needs to develop a new switching system which accommodates trunk lines for telephones, data terminals, public networks, etc. Therefore, it is not easy to change the installations.

Communication networks are built with telephone networks as their centers. Therefore, what is important is not to simply add new systems, but to minimize the increase of installations by the use of the existing network systems in order to provide new services.

The conventional Internet telephone must be connected to a dedicated server in order to speak. Moreover, the inability to ensure bandwidth for the conventional Internet telephone causes delay or lack of speech, resulting in poor speech communication quality.

SUMMARY OF THE INVENTION

An object of the present invention is to provide a communication apparatus for performing high-quality communication by integrating speech and data efficiently.

Another object of the present invention is to provide a communication system for performing high-quality communication by integrating speech and data efficiently.

Still another object of the present invention is to provide a method for integrating speech and data for performing high-quality communication by integrating speech and data efficiently.

In order to achieve the above object, a communication apparatus for communicating speech and data is provided. This communication apparatus comprises frame controlling means for integrating speech frames, being speech signals made into frames, and data frames, being data made into frames, into integrated frames and controlling the routing of the speech frames, the data frames, and the integrated frames, input processing means for storing and managing at least one of the three types of frames of the speech frames, the data frames, and the integrated frames, and output processing means for storing and managing the frames transferred, setting a bandwidth ratio of the frames dynamically, and transmitting the speech frames, the data frames, and the integrated frames from on lines.

Furthermore, in order to achieve the above object, a communication system for communicating speech and data is provided. This communication system comprises a telephone switching system, a network connecting device for performing a connecting process between networks, and a communication apparatus comprising frame controlling means for integrating speech frames, being speech signals made into frames, and data frames, data made into frames, into integrated frames and controlling the routing of the speech frames, the data frames, and the integrated frames, input processing means for storing and managing at least one of the three types of frames of the speech frames, the data frames, and the integrated frames, and output processing means for storing and managing the frames transferred, setting a bandwidth ratio of the frames dynamically, and transmitting the speech frames, the data frames, and the integrated frames from on lines and connected to at least one of an office telephone interface line of the telephone switching system, an office data interface line of the network connecting device, and an interoffice trunk line.

Moreover, in order to achieve the above object, a method for integrating speech and data for communicating by integrating and controlling speech and data is provided. This method for integrating speech and data comprises the step of integrating speech frames, being speech signals made into frames, and data frames, being data made into frames, into integrated frames, the step as an input-side process of storing and managing at least one of the three types of frames of the speech frames, the data frames, and the integrated frames, the step of controlling the routing of the speech frames, the data frames, and the integrated frames, and the step as an output-side process of storing and managing the frames transferred, setting a bandwidth ratio of the frames dynamically, and transmitting the speech frames, the data frames, and the integrated frames from on lines.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENT

Figure 1:
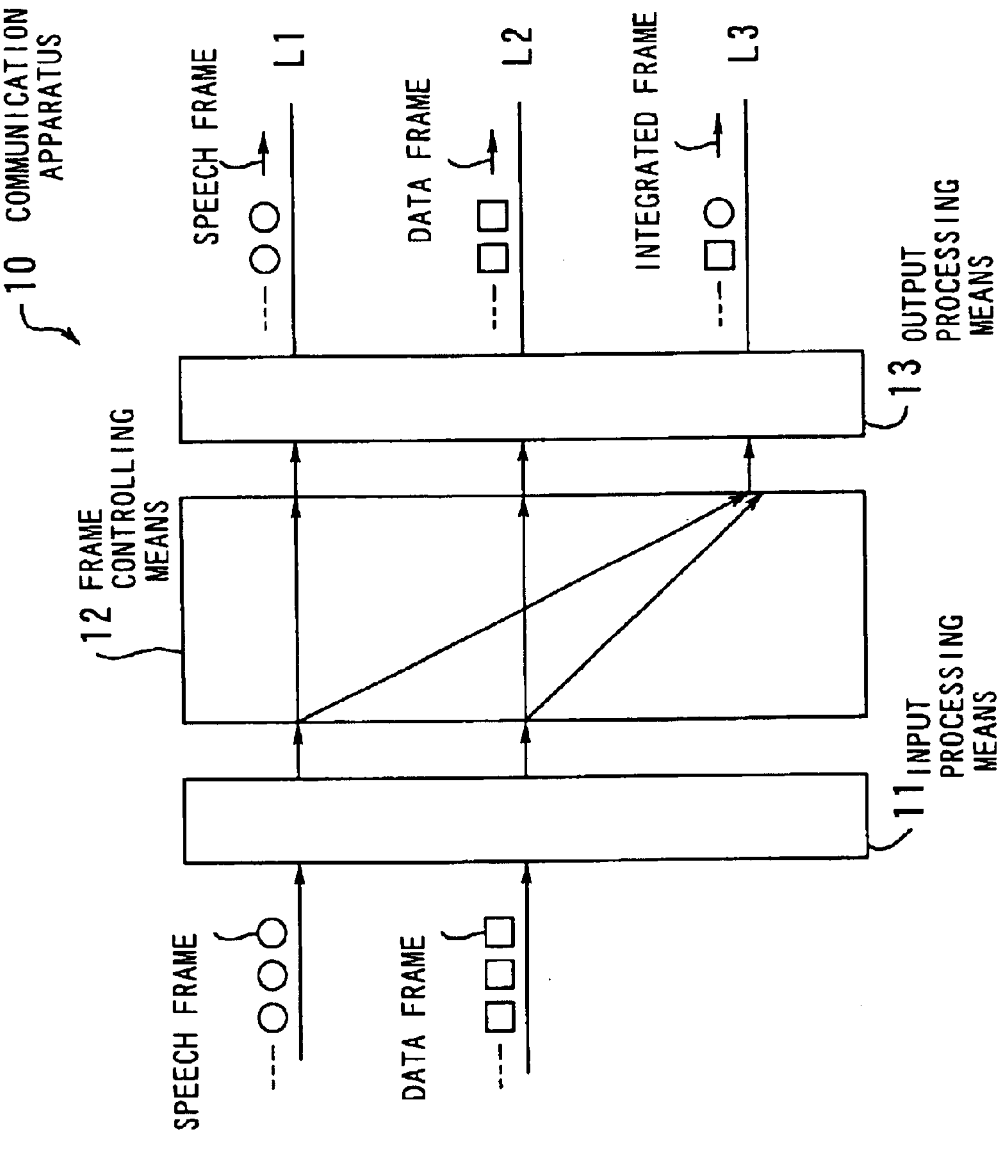
FIG. 1 is a view for describing the principle of a communication apparatus according to the present invention.

An embodiment of the present invention will now be described with reference to the drawings. FIG. 1 is a view for describing the principle of a communication apparatus according to the present invention. A communication apparatus 10 communicates speech and data. In the present invention, speech means a speech signal on a telephone line and data means Internet protocol (IP) data.

Frame controlling means 12 integrates speech frames, being speech signals made into frames, and data frames, data made into frames, into integrated frames and controls the routing of speech frames, data frames, and integrated frames.

Input processing means 11 stores and manages at least one type of speech frames, data frames, and integrated frames. In FIG. 1 speech and data frames are input. However, if the communication apparatus 10 connects with another communication apparatus and this communication apparatus sends integrated frames, they will also be input to the input processing means 11.

Output processing means 13 stores and manages these frames transferred. In addition, it sets a bandwidth ratio of frames dynamically and transmits speech frames, data frames, and integrated frames from on lines.

In FIG. 1, speech frame bandwidth is assigned to line L1 and speech frames are transmitted via line L1; data frame bandwidth is assigned to line L2 and data frames are transmitted via line L2.

Moreover, integrated frame bandwidth is assigned to line L3 and integrated frames are transmitted via line L3. That is to say, signals in which speech and data mix are transmitted via line L3.

There is little telephone traffic at night-time. In this case the output processing means 13 can assign data frame bandwidth dynamically to, for example, line L1 to which speech frame bandwidth is assigned in the daytime. Volumes of data can be transferred in this way, which enables flexible transmission control.

Figure 2:
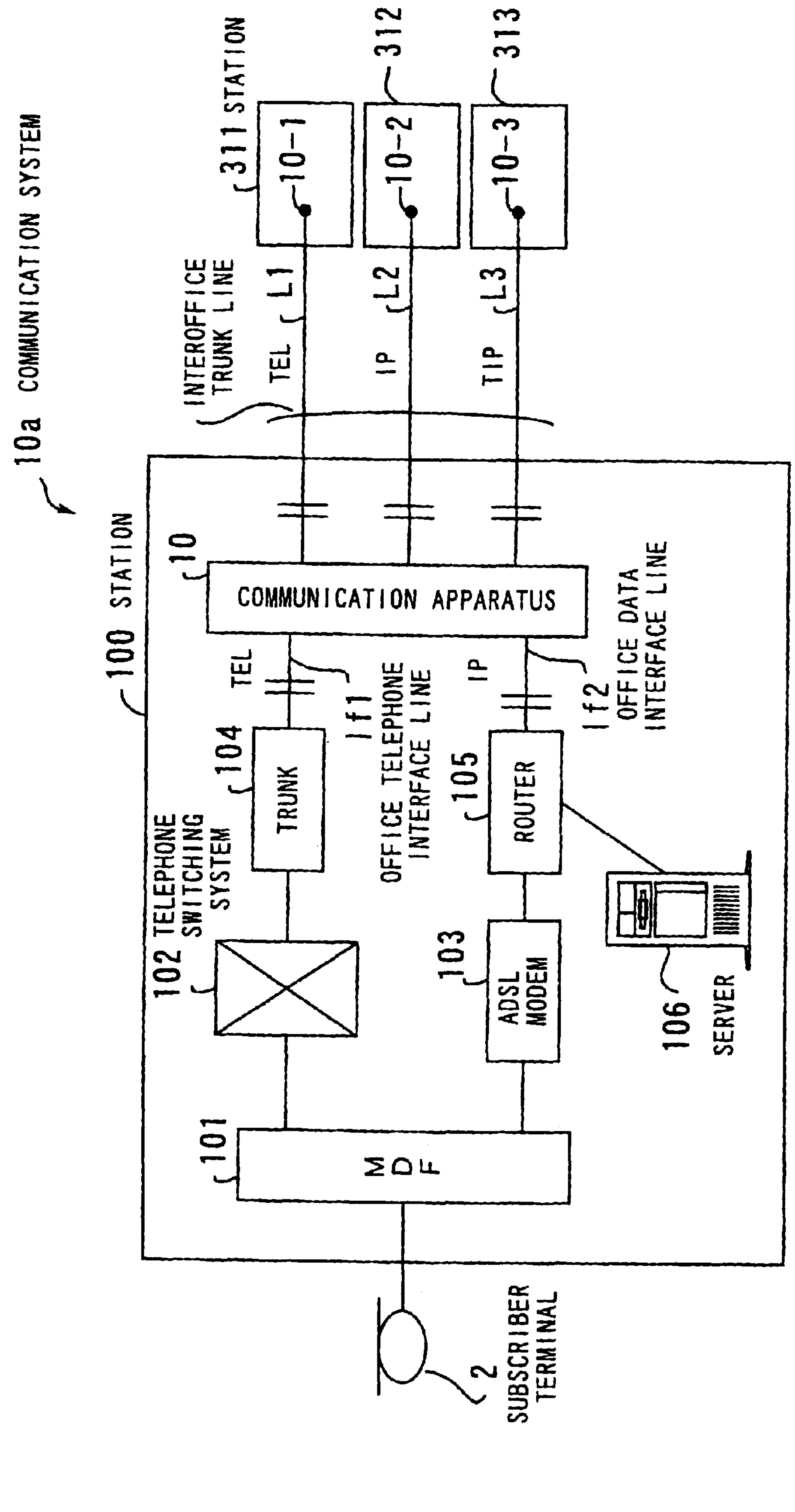
FIG. 2 is a view showing the configuration of a communication system.

A communication system according to the present invention in which the communication apparatus 10 is applied will now be described. FIG. 2 is a view showing the configuration of a communication system. A communication system 10*a* comprises a telephone switching system 102, a network connecting device 105 (router 105 in FIG. 2) corresponding to a router or gateway, and the communication apparatus 10.

The communication apparatus 10 is connected to at least one of office telephone interface line If1 of the telephone switching system 102, office data interface line If2 of the router 105, and interoffice trunk lines L1 through L3.

With the communication system 10*a*, a subscriber terminal 2 corresponding to a telephone, personal computer, or the like is connected to the telephone switching system 102 and an asymmetric digital subscriber line (ADSL) modem 103 via a main distributing frame (MDF) 101 in a station 100.

The MDF 101 is a distributing frame for accommodating and distributing communication cables. The ADSL modem 103 is one for performing high-speed digital communication by the use of a telephone line.

A trunk 104 connects with the telephone switching system 102 and the communication apparatus 10 and controls an interface for speech signals. The router 105 connects with the ADSL modem 103, the communication apparatus 10, and a server 106 and controls an interface for IP packets.

The station 100 connects with stations 311 through 313 via interoffice trunk lines L1 through L3 respectively. The communication apparatus 10 in the station 100 connects with a communication apparatus 10-1 in the station 311 via speech interface (TEL) line L1.

The communication apparatus 10 in the station 100 connects with a communication apparatus 10-2 in the station 312 via data interface (IP) line L2; the communication apparatus 10 in the station 100 connects with a communication apparatus 10-3 in the station 313 via integrated interface (Telephone IP: TIP) line L3.

In this case, for example, office telephone interface line If1 and office data interface line If2 each accommodate 622-Mbps OC12/STM-4 interface.

Speech interface line L1 accommodates 156-Mbps OC3/STM-1 interface; data interface line L2 and integrated interface line L3 each accommodate 622-Mbps OC12/STM-4 interface.

Figure 3:
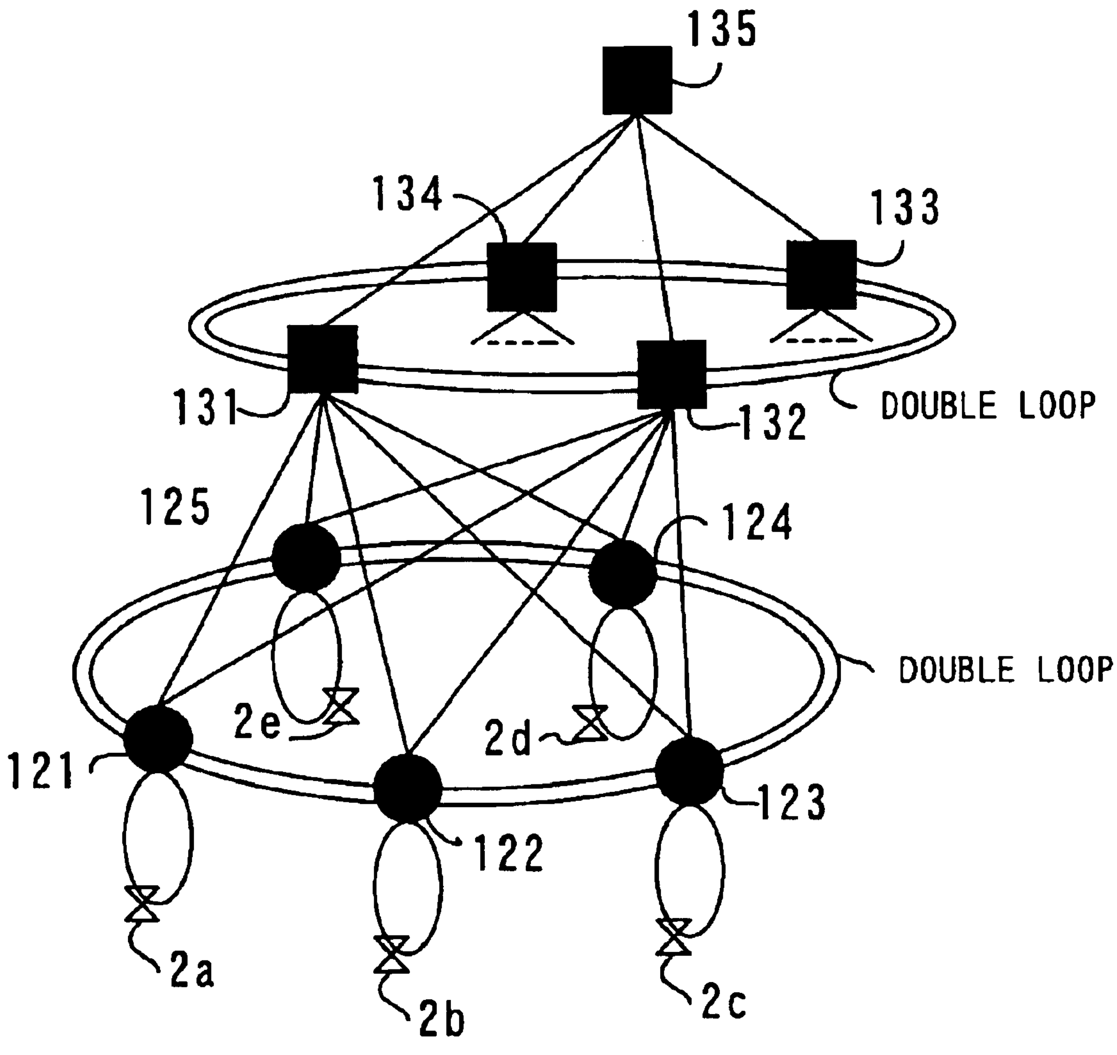
FIG. 3 is a view showing a model for network configuration.

FIG. 3 is a view showing a model for network configuration. In FIG. 3, black circles indicate stations having a local switch (LS) and black squares indicate stations having a toll switch (TS). Furthermore, all stations include the communication apparatus 10 according to the present invention.

Stations 121–125 at LS stage are exchanges for accommodating subscribers, have a double loop configuration (currently-used/spare connection configuration), and connect with subscriber terminals 2*a*–2*e* respectively.

Stations 131–134 at TS stage are exchanges having a relay function and have a double loop configuration. The stations 131 and 132 each connect with the stations 121–125. A regional center 135 is an exchange for managing stations in an network and connects with the stations 131–134.

Figure 4:
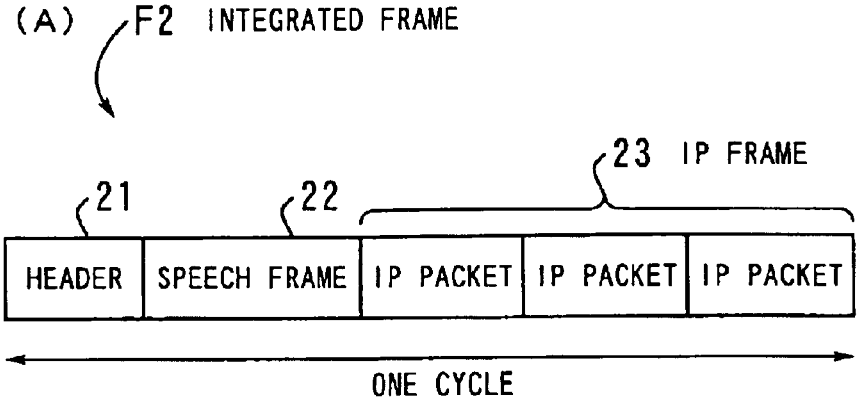
FIG. 4 are views showing the structure of frames.
Figure 4:
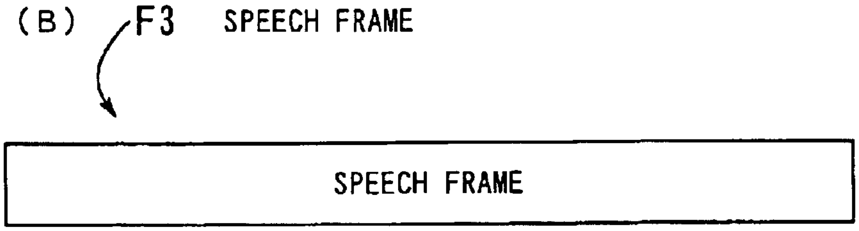
Figure 4:
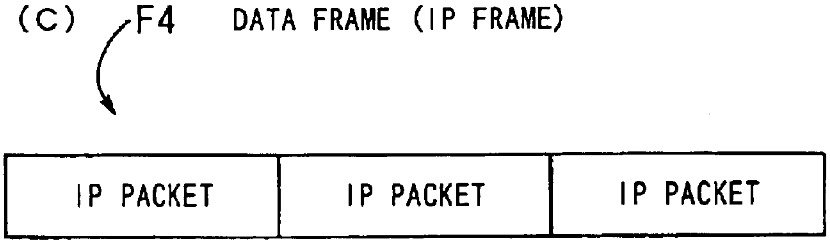

Now, the structure of frames output from the communication apparatus 10 will be described. FIG. 4 are views showing the structure of frames. FIGS. 4(A), 4(B), and 4(C) indicate the structure of integrated frame F2 on integrated interface line L3, speech frame F3 on speech interface line L1, and data frame (IP frame) F4 on data interface line L2 respectively.

Integrated frame F2 shown in FIG. 4(A) consists of a header 21, a speech frame 22, and an IP frame 23. In integrated frame F2, bandwidth used actually for a telephone line is occupied by the speech frame 22 and the rest of the bandwidth is assigned to the IP frame 23.

In addition, the IP frame 23 consists of, for example, three IP packets in one cycle and QOS priority for each packet is set. This priority information is set in the header 21 (described later in FIG. 5).

Speech frame F3 shown in FIG. 4(B) is a frame signal generated by making telephone speech into a frame. IP frame F4 shown in FIG. 4(C) consists of a plurality of IP packets.

Figure 5:
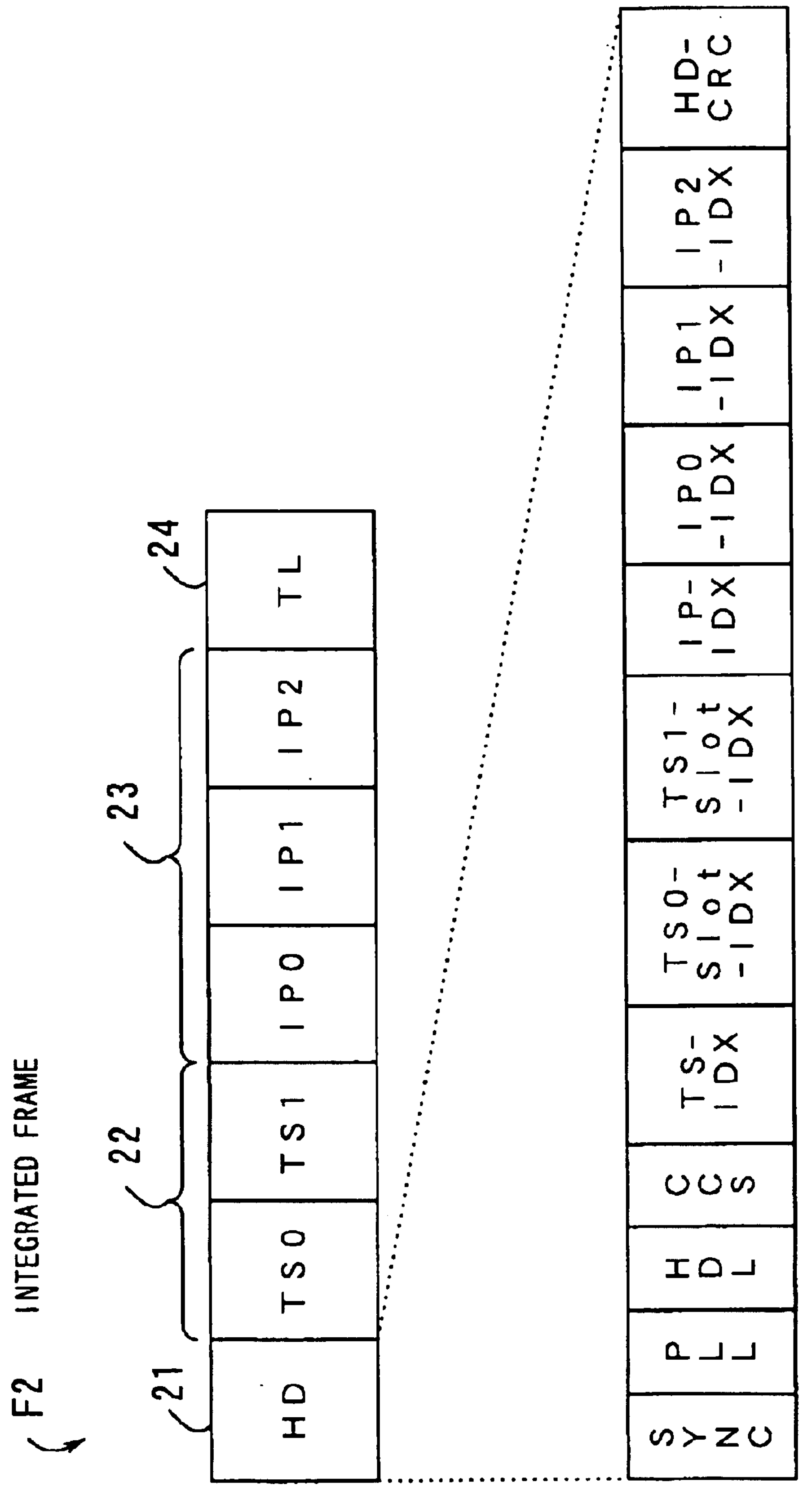
FIG. 5 is a view showing the structure of an integrated frame in detail.

Now, the structure of integrated frame F2 will be described in detail. FIG. 5 is a view showing the structure of integrated frame F2 in detail. Integrated frame F2 consists of the header (HD) 21, the speech frame (TS0 and TS1) 22, the IP frame (IP0, IP1, and IP2) 23, and a tail (TL) 24 with CRC indicating the tail of a frame.

In this case, TS0 is a speech frame for an upper telephone line and TS1 is a speech frame for an ordinary telephone line. IPn (IP0 through IP2) is an IP packet frame with priority "n." For example, priority "0" corresponds to bandwidth-guaranteed connection-mode communication and priority "1" and "2" correspond to non-bandwidth-guaranteed connectionless-mode communication (best-effort etc.).

In the header 21, SYNC is a synchronizing pattern; PLL is payload length; HDL is header length; CCS is a control field for No. 7 common line signaling system for telephone and IP. CCS enables to ensure bandwidth for control signals for speech and IP and to transmit them without being influenced by traffic.

TS-IDX is a telephone frame index. TS0-Slot-IDX is an upper telephone slot-state index. For example, "00," "01," "10," and "11" indicate "inactive/shut down," "inactive/shut down for maintenance," "active and unused," and "active and used" respectively. TS1-Slot-IDX is an ordinary telephone slot-state index. For example, "00," "10," "10," and "11" indicate "inactive/shut down," "inactive/shut down for maintenance," "active and unused," and "active and used" respectively.

IP-IDX and IPn-IDX correspond to priority information fields. IP-IDX is an IP frame index; IPn-IDX is an nth-priority IP packet index. HD-CRC is header CRC.

As described above, the communication apparatus 10 according to the present invention controls the routing of speech frames, IP frames, and integrated frames, and transmits speech frames, IP frames, and integrated frames via speech interface line L1, data interface line L2, and integrated interface line L3 respectively.

Furthermore, speech frames are guaranteed bandwidth which they use, and the transmission of IP frames is controlled on the basis of priority as a semi-bandwidth guarantee.

This improves speech communication quality by comparison with conventional Internet telephone and enables to communicate by integrating speech and IP frames.

Moreover, by configuring the communication system 10*a* according to the present invention by connecting the communication apparatus 10 according to the present invention to office telephone interface line If1, office data interface line If2, and interoffice trunk lines, speech communication, data communication, and speech-data communication in which speech and data are integrated can be performed easily. In addition, by making good use of the existing network systems, new services can be provided with the increase of installations minimized.

Figure 6:
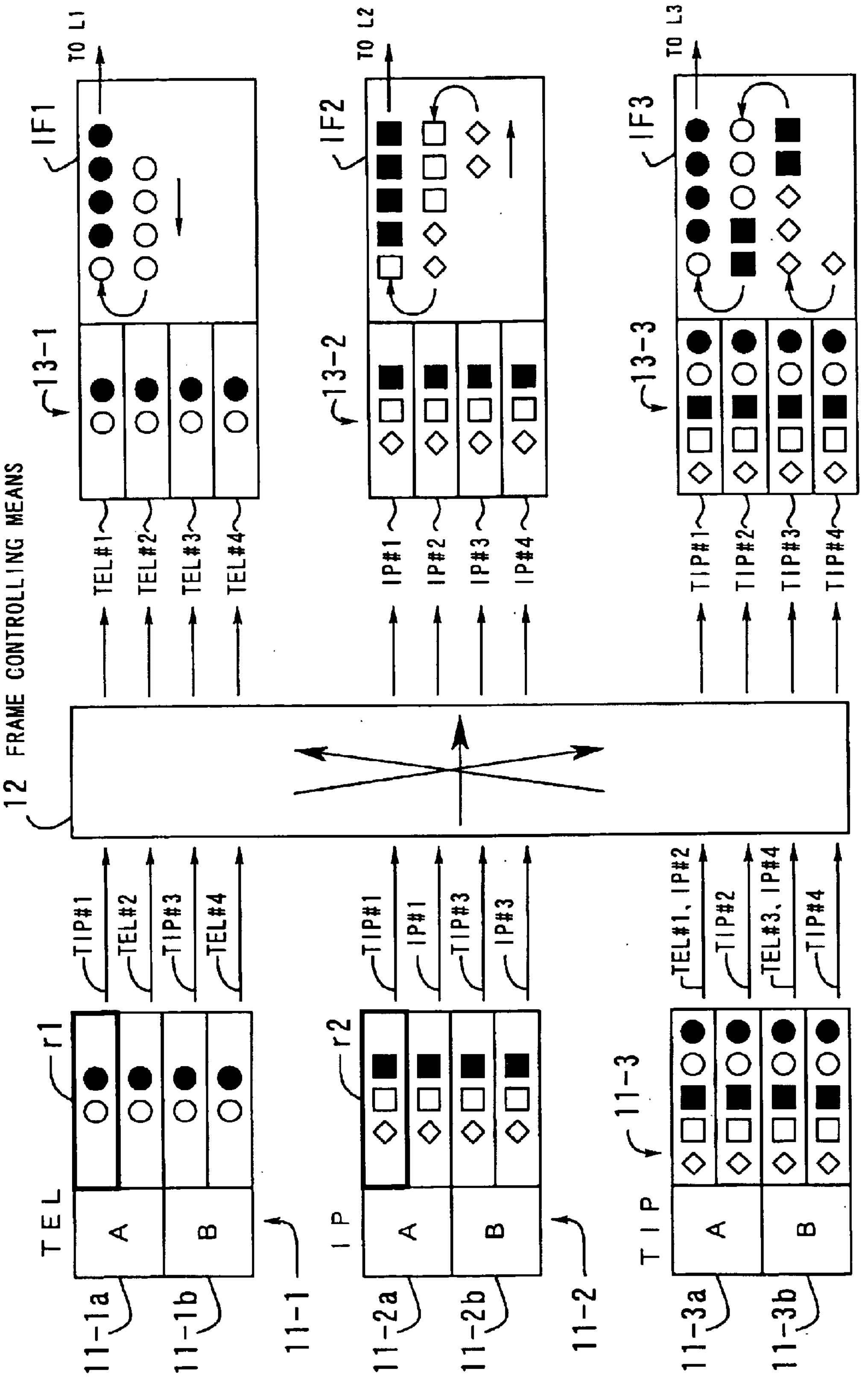
FIG. 6 is a schematic showing a process for transferring frames.

The process of transferring frames will now be described. FIG. 6 is a schematic showing a process for transferring frames. Black circles, white circles, black squares, white squares, and diamonds in FIG. 6 indicate upper speech frames, ordinary speech frames, first-priority IP frames, second-priority IP frames, and third-priority IP frames respectively.

Input processing means 11-1 which stores speech frames has a storage area consisting of A and B sides. It is assumed that A and B sides are receiving buffers 11-1*a* and 11-1*b* respectively. Furthermore, in FIG. 6 the receiving buffers 11-1*a* and 11-1*b* each have a storage area for two lines.

Similarly, input processing means 11-2 which stores IP frames consists of receiving buffers 11-2*a* and 11-2*b* and the receiving buffers 11-2*a* and 11-2*b* each have a storage area for two lines. Input processing means 11-3 which stores integrated frames consists of receiving buffers 11-3*a* and 11-3*b* and the receiving buffers 11-3*a* and 11-3*b* each have a storage area for two lines.

Sides of the above receiving buffers 11-1*a* through 11-3*a* and 11-1*b* through 11-3*b* are switched at cycles of, for example, 2 milliseconds. The cycle of each frame therefore is also 2 milliseconds.

On the other hand, output processing means 13-1 which stores and outputs speech frames transferred from the frame controlling means 12 has storage areas TEL#1 through TEL#4 for four lines. Similarly, output processing means 13-2 which stores and outputs IP frames transferred from the frame controlling means 12 has storage areas IP#1 through IP#4 for four lines; output processing means 13-3 which stores and outputs integrated frames transferred from the frame controlling means 12 has storage areas TIP#1 through TIP#4 for four lines.

IF1 through IF3 in FIG. 6 indicate the flow of frames on lines. IF1 indicates that upper speech frames and ordinary speech frames are transmitted via speech interface line L1 in that order.

IF2 indicates that first-priority IP frames, second-priority IP frames, and third-priority IP frames are transmitted via data interface line L2 in that order.

IF3 indicates that upper speech frames, ordinary speech frames, first-priority IP frames, second-priority IP frames, and third-priority IP frames are transmitted via integrated interface line L3 in that order.

The process of transferring frames is performed in the following way. Speech frames in storage area r1 of the receiving buffer 11-1*a* are transferred to storage area TIP#1 of the output processing means 13-3 by the frame controlling means 12. IP frames in storage area r2 of the receiving buffer 11-2*a* are transferred to storage area TIP#1 of the output processing means 13-3.

When frames are transferred, the frame controlling means 12 generates integrated frames by adding necessary header information. These integrated frames are stored in storage area TIP#1 of the output processing means 13-3.

The output processing means 13-3 then sets bandwidth dynamically with the traffic on integrated interface line L3 taken into consideration and outputs the integrated frames. The process of transferring other frames is also performed in the same way, so descriptions of them will be omitted.

Telephone switching systems and routers which have already been installed can be used for single-office telephone switching and local IP connection in order to avoid centralized load processing. This will not be covered by the communication apparatus 10 according to the present invention.

Figure 7:
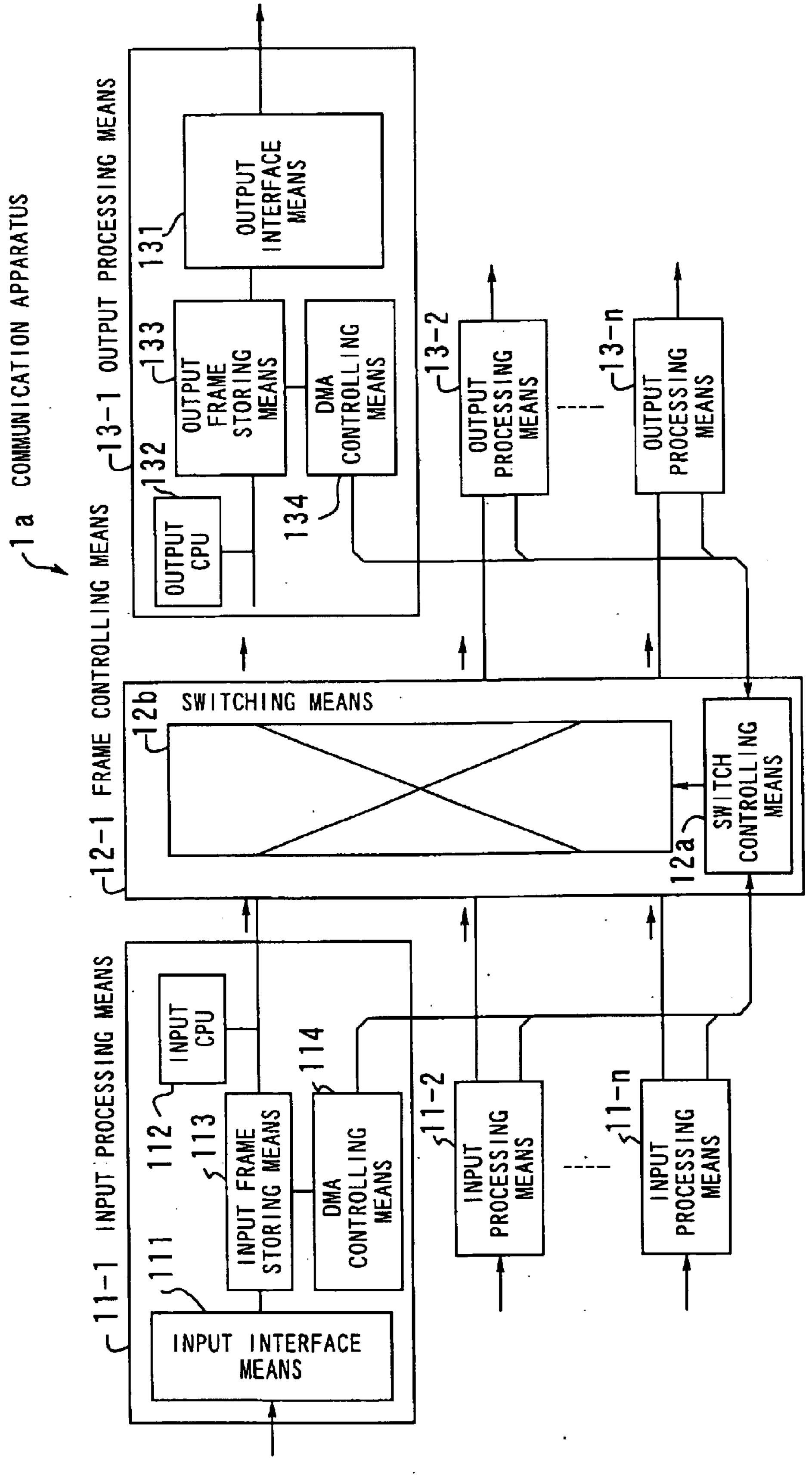
FIG. 7 is a view showing the configuration of a communication apparatus.

Now, the configuration of the communication apparatus 10 for realizing the above process of transferring frames will be described in detail. FIG. 7 is a view showing the configuration of a communication apparatus. A communication apparatus 1*a* consists of input processing means 11-1 through 11-*n*, frame controlling means 12-1, and output processing means 13-1 through 13-*n*.

In the input processing means 11-1, input interface means 111 controls an interface in order to receive input frames, being speech frames, IP frames, or integrated frames.

An input CPU 112 controls all the inside of the input processing means 11-1. Input frame storing means 113 consists of two receiving buffers, as described in FIG. 6, and stores input frames. In addition, the input frame storing means 113 sends input frames to the frame controlling means 12-1 in accordance with an instruction from the input CPU 112.

Direct memory access (DMA) controlling means 114 sends the frame controlling means 12-1 information regarding input frames (including a destination and corresponding to header information described in FIG. 5) stored in the input frame storing means 113. The internal configuration of the input processing means 11-2 through **11-*n* is the same as that of the input processing means 11-1**, so descriptions of them will be omitted.

In the output processing means 13-1, output interface means 131 controls an interface in order to send output frames, being speech frames, IP frames, or integrated frames, from on a line.

An output CPU 132 controls all the inside of the output processing means 13-1. Output frame storing means 133 stores output frames sent from the frame controlling means 12-1. In addition, the output frame storing means 133 sends output frames to the output interface means 131 in accordance with an instruction from the output CPU 132.

DMA controlling means 134 sends the frame controlling means 12-1 information regarding output frames stored in the output frame storing means 133. The internal configuration of the output processing means 13-2 through 13-n is the same as that of the output processing means 13-1, so descriptions of them will be omitted.

The frame controlling means 12-1 consists of switch controlling means **12*a* and switching means 12*b*. The switch controlling means 12*a* controls the routing of frames (controls routing in order to transfer frames from input processing means to the corresponding output processing means) and the switching means 12*b* on the basis of frame information sent from the DMA controlling means 114 and 134. The switching means 12*b* performs a switching transfer of frames in accordance with an instruction from the switch controlling means 12*a***.

As described above, the frame controlling means 12-1 of the communication apparatus la controls routing on the basis of frame information and performs a switching transfer of frames to one of the output processing means 13-1 through **13-*n***. This enables communication in which speech and data are integrated efficiently.

Figure 8:
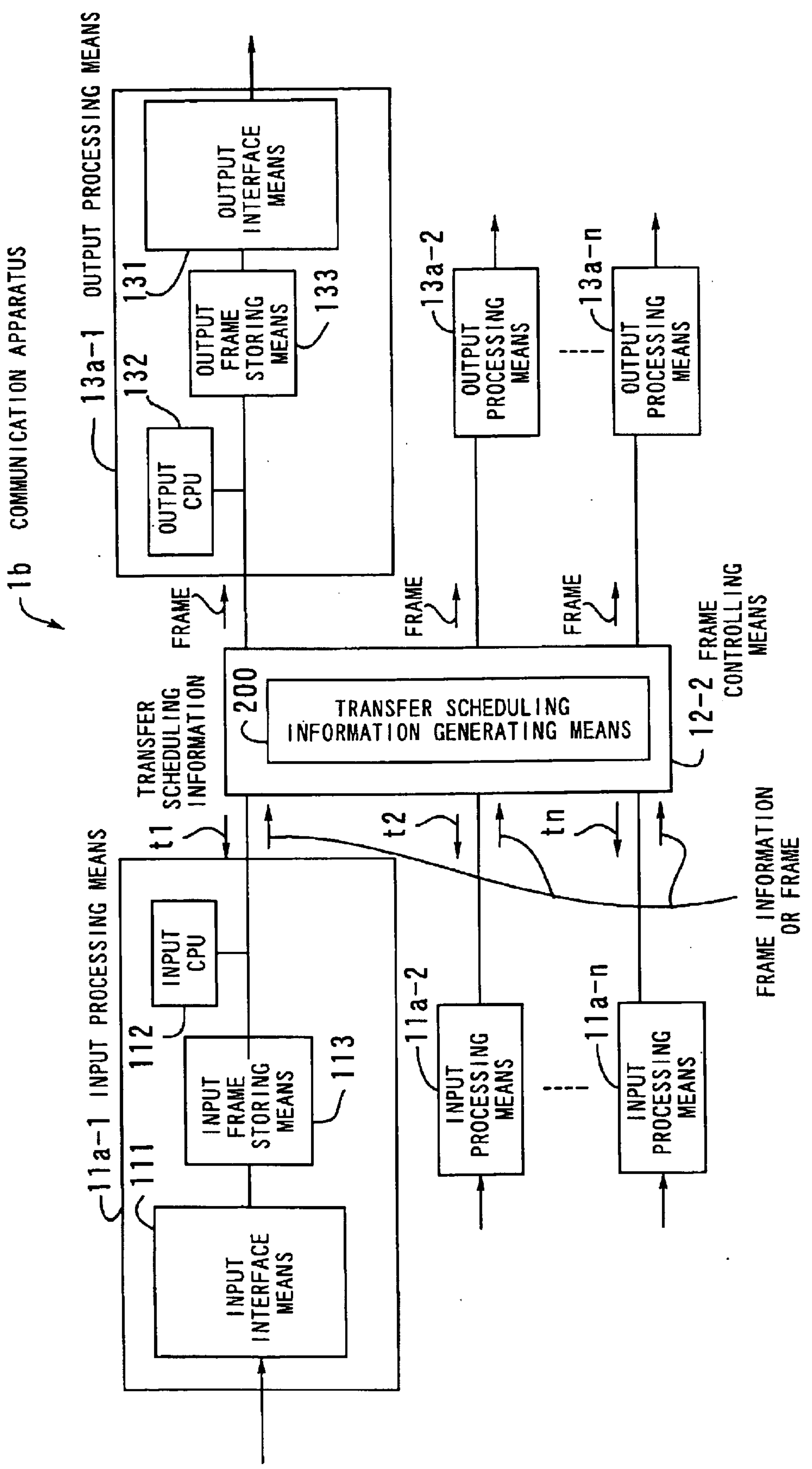
FIG. 8 is a view showing the configuration of a communication apparatus.

A modification of the communication apparatus **1*a* will now be described. FIG. 8 is a view showing the configuration of a communication apparatus. A communication apparatus 1*b*, being a modification of the communication apparatus 1*a*, consists of input processing means 11*a*-1 through 11*a*–*n*, frame controlling means 12-2, and output processing means 13*a*-1 through 13*a*–*n***.

In the input processing means **11*a*-1, the input interface means 111** controls an interface in order to receive input frames, being speech frames, IP frames, or integrated frames.

The input CPU 112 controls all the inside of the input processing means **11*a*-1. The input frame storing means 113 consists of two receiving buffers, as described in FIG. 6, and stores input frames. In addition, the input frame storing means 113 sends input frames and frame information to frame controlling means 12-2 in accordance with an instruction from the input CPU 112. The internal configuration of the input processing means 11*a*-2 through 11*a*–*n* is the same as that of the input processing means 11*a*-1**, so descriptions of them will be omitted.

In the output processing means **13*a*-1, the output interface means 131** controls an interface in order to send output frames, being speech frames, IP frames, or integrated frames, from on a line.

The output CPU 132 controls all the inside of the output processing means **13*a*-1. The output frame storing means 133 stores output frames sent from the frame controlling means 12-2. In addition, the output frame storing means 133 sends output frames to the output interface means 131 in accordance with an instruction from the output CPU 132. The internal configuration of the output processing means 13*a*-2 through 13*a*–*n* is the same as that of the output processing means 13*a*-1**, so descriptions of them will be omitted.

The frame controlling means 12-2 includes transfer scheduling information generating means 200. The transfer scheduling information generating means 200 performs routing control (controls routing in order to transfer frames from input processing means to the corresponding output processing means) and generates transfer scheduling information t1 through tn regarding routes, on the basis of frame information sent from the input processing means **11*a*-1 through 11*a*–*n***.

In order to transfer frames, first the input processing means **11*a*-1 sends the transfer scheduling information generating means 200 information regarding frames stored in the input frame storing means 113**.

When the transfer scheduling information generating means 200 receives the frame information, it generates transfer scheduling information t1 and returns transfer scheduling information t1 to the input processing means **11*a*-1**.

The input processing means **11*a*-1 receives transfer scheduling information t1. Then the input processing means 11*a*-1 determines, from the contents of transfer scheduling information t1, the output processing means to which frames stored in the input frame storing means 113 should be sent. After the determination, the input processing means 11*a*-1 sends them to the corresponding output processing means via the frame controlling means 12-2. A transfer of frames by the input processing means 11*a*-2 through 11*a*–*n*** is performed in the same way, so descriptions of it will be omitted.

In the communication apparatus **1*b* according to the present invention, as described above, the transfer scheduling information generating means 200 in the frame controlling means 12-2 generates transfer scheduling information t1 through tn on the basis of frame information. Then frames are transferred from the input processing means 11*a*-1 through 11*a*–*n* to the corresponding output processing means 13*a*-1 through 13*a*–*n* on the basis of transfer scheduling information t1** through tn.

This eliminates the necessity for switching management, which is necessary for the communication apparatus **1*a*. Therefore, the communication apparatus 1*b*** can be used for high-speed transfer and is applicable to high-speed communication between general-purpose processors.

Figure 9:
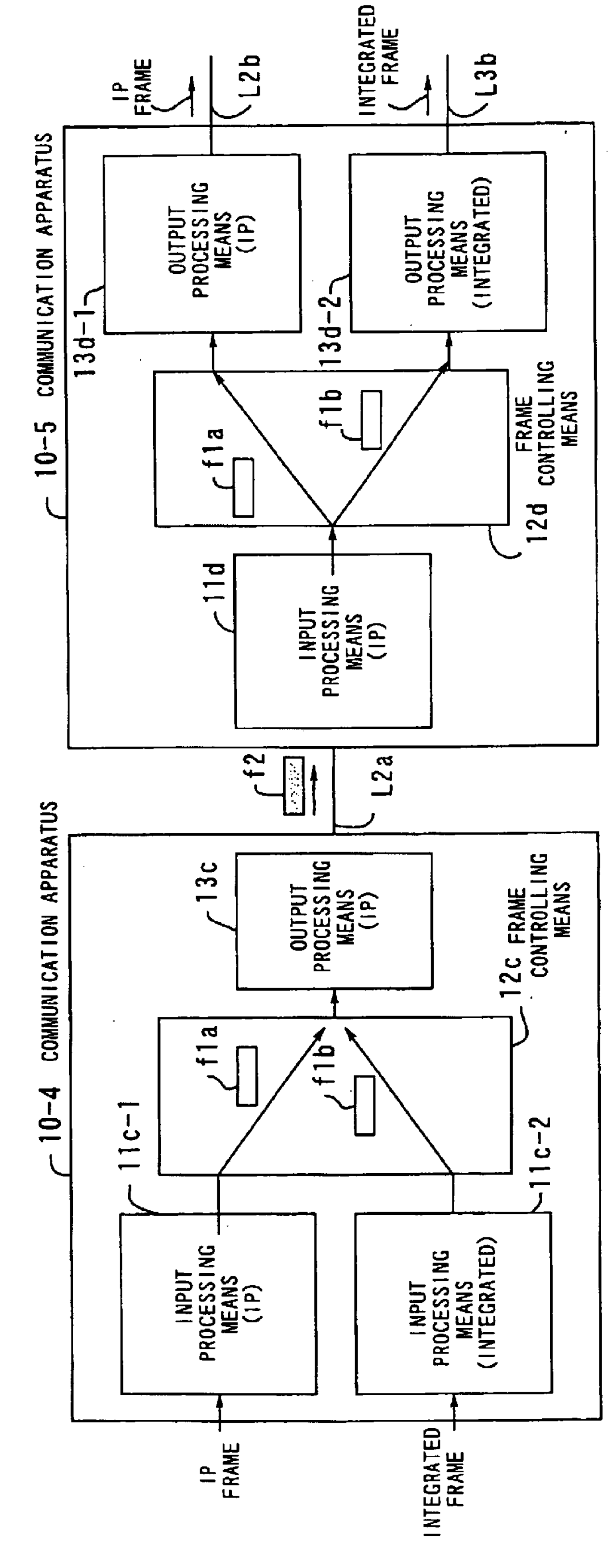
FIG. 9 is a view roughly showing a process performed when identical IP frames exist.

Now, a process performed when IP frames include identical frames will be described. FIG. 9 is a view roughly showing a process performed when identical IP frames exist.

In a communication apparatus 10-4, input processing means **11*c*-1 performs an input process on IP frames and outputs them to frame controlling means 12*c*. Input processing means 11*c*-2 performs an input process on integrated frames and outputs them to the frame controlling means 12*c***.

The frame controlling means **12*c* transfers IP frame f1*a* sent from the input processing means 11*c*-1 and IP frame f1*b*** included in integrated frames sent from the input processing means 11*c*-2 to output processing means 13*c* which performs an output process on IP frames. In this case, it is assumed that IP frame f1*a* and IP frame f1*b* have the same payload.

The output processing means 13*c* considers IP frame f1*a* and IP frame f1*b* to be the same, generates representative frame f2 to which index information indicating to that effect is added, and transmits it from on data frame line L2*a*.

This index information includes information that IP frame f1*a* and IP frame f1*b* are integrated into one representative frame f2, destinations of IP frame f1*a* and IP frame f1*b*, etc.

In a communication apparatus 10-5, input processing means 11*d* receives representative frame f2, performs an input process on it, and outputs it to frame controlling means 12*d*.

The frame controlling means 12*d* divides representative frame f2 sent from the input processing means 11*d* into IP frame f1*a* and IP frame f1*b* on the basis of index information and transfers IP frame f1*a* to output processing means 13*d*-1.

Furthermore, the frame controlling means 12*d* integrates a speech frame sent from input processing means (which performs an input process on speech frames and is not shown) and IP frame f1*b* into an integrated frame and transfers it to output processing means 13*d*-2.

The output processing means 13*d*-1 transmits IP frame f1*a* onto data frame line L2*b*. The output processing means 13*d*-2 transmits an integrated frame including IP frame f1*b* onto integrated frame line L3*b*.

In the present invention, as described above, when IP frames include identical frames, output processing means generates one representative frame and transmits it onto a line. Then frame controlling means at the receiving end restores the representative frame to a plurality of identical frames as they were. This enables to reduce the traffic on an interoffice trunk line.

Figure 10:
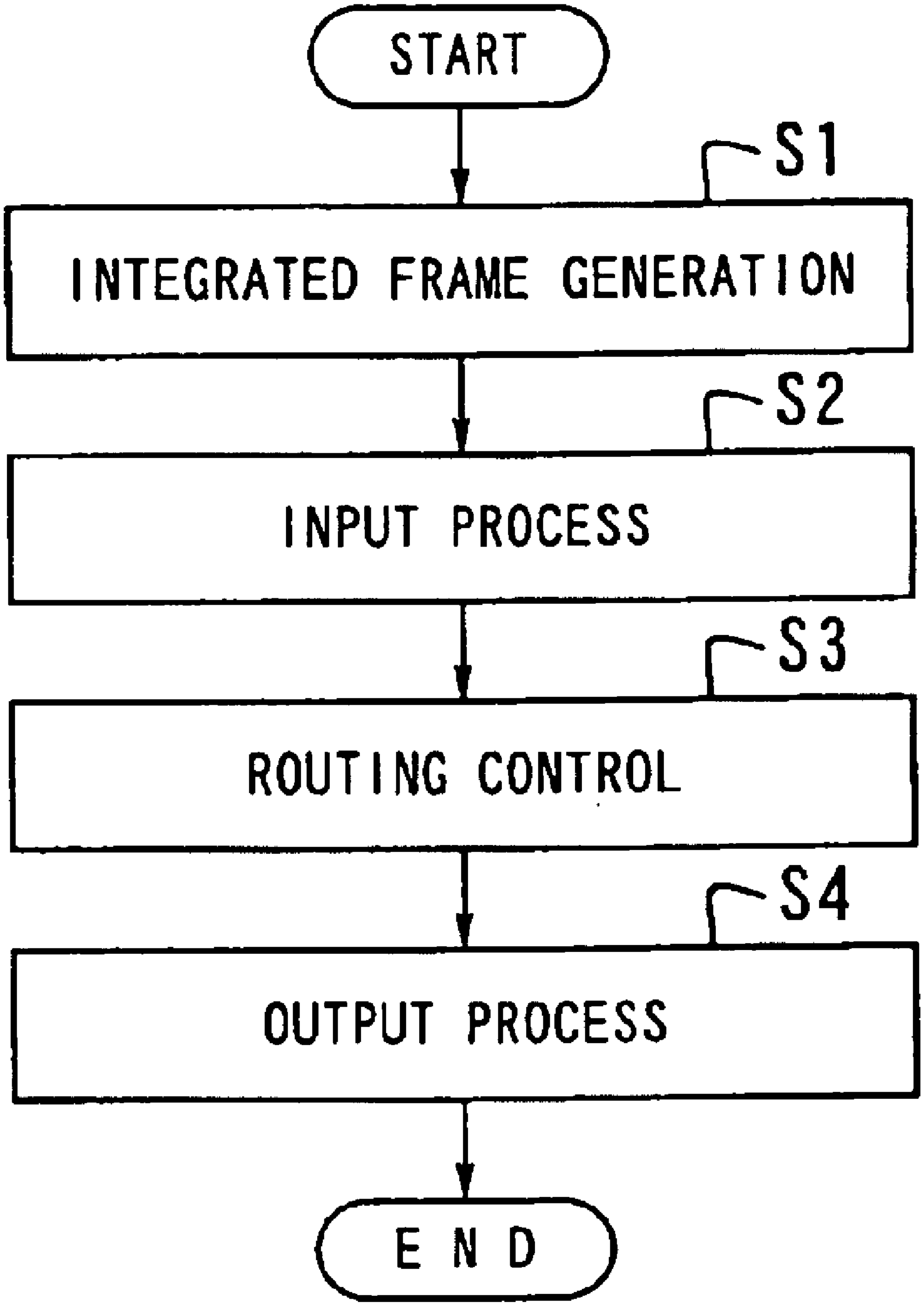
FIG. 10 is a flow chart showing the procedure of processes performed in a method for integrating speech and data according to the present invention.

A method for integrating speech and data according to the present invention will now be described. FIG. 10 is a flow chart showing the procedure of processes performed in a method for integrating speech and data according to the present invention.

[S1] Integrated frames are generated by integrating speech frames, being speech signals made into frames, and data frames, data made into frames.

When integrated frames are generated, speech frames occupy the bandwidth which they use, and the rest of the bandwidth is assigned to data frames. Furthermore, when integrated frames are generated, priority information fields for data frames are created. In that case, high and low priority correspond to connection-mode and connectionless-mode communication respectively. In addition, when integrated frames are generated, an information field for controlling common line signals is created.

[S2] The input side stores and manages at least one of the three types of frames of speech frames, data frames, and integrated frames. In this case, frames are stored by switching two storage areas every cycle.

[S3] The routing of speech frames, data frames, and integrated frames is controlled.

[S4] The output side stores and manages frames transferred, and transmits speech and data frames via a speech and data interface line respectively. Furthermore, the output side transmits integrated frames via an integrated interface line.

In this case, routing control and a switching transfer of frames to the output side are performed on the basis of frame information.

Furthermore, on the basis of frame information, routing control is performed and transfer scheduling information is generated. The input side transfers frames to the output side on the basis of the transfer scheduling information.

When data frames transferred include identical frames, the output side generates and outputs one representative frame. If a representative frame is received, then a plurality of identical frames are generated at the time of routing control.

As described above, a communication apparatus, communication system, and method for integrating speech and data according to the present invention can improve network efficiency by integrating speech and data with a trunk line.

Moreover, the bandwidth ratio of Internet to telephone can be changed dynamically, so line efficiency can be improved. In addition, if all telephone exchanges are equipped with this apparatus, Internet services can be provided in all areas including depopulated ones.

As described above, a communication apparatus according to the present invention controls the routing of speech frames, data frames, and integrated frames, assigns bandwidth dynamically to lines, and transmits speech frames, data frames, and integrated frames via each line. This enables communication in which speech frames and data frames are integrated efficiently.

Furthermore, a communication system according to the present invention is configured by connecting a communication apparatus to at least one of an office telephone interface line, an office data interface line, and an interoffice trunk line. This will make it easy to perform speech communication, data communication, and speech-data communication in which speech and data are integrated. In addition, this will enable to provide new services with the increase of installations minimized.

Moreover, a method for integrating speech and data according to the present invention controls the routing of speech frames, data frames, and integrated frames, assigns bandwidth dynamically to lines, and transmits speech frames, data frames, and integrated frames via each line. This enables communication in which speech frames and data frames are integrated efficiently.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication apparatus for communicating speech and data, the apparatus comprising:

input processing means for storing and managing at least one of three types of frames which include speech frames carrying speech signals, data frames carrying data signals, and integrated frames carrying both speech and data signals;

frame controlling means for intergrating the speech frames, and data frames, into the integrated frames and performing routing control of the speech frames, data frames, and integrated frames each integrated frame allowing the speech frame integrated therein to occupy as much bandwidth as required, while assigning the remaining bandwidth to the data frame therein, the data frame containing a plurality of packets to each of which QOS priority is set; and output processing means for storing and transmitting the frames routed by said frame controlling means, while dynamically setting a bandwidth ratio therefore.

2. The communication apparatus according to claim 1, wherein the frame controlling means generates the integrated frames by creating priority information fields for the data frames in which high priority corresponds to connection-mode communication and low priority corresponds to connectionless-mode communication.

3. The communication apparatus according to claim 1, wherein the frame controlling means generates the integrated frames by creating an information field for controlling common line signals.

4. The communication apparatus according to claim 1, wherein the input processing means has two storage areas and stores the frames by switching the storage areas every cycle.

5. The communication apparatus according to claim 1, wherein the frame controlling means performs the routing control and a switching transfer of the frames to the output processing means on the basis of information regarding the frames.

6. The communication apparatus according to claim 1, wherein the frame controlling means performs the routing control and generates transfer scheduling information, on the basis of information regarding the frames.

7. The communication apparatus according to claim 6, wherein the input processing means transfers the frames to the output processing means on the basis of the transfer scheduling information.

8. The communication apparatus according to claim 1, wherein the output processing means generates and outputs one representative frame when the data frames transferred include identical frames.

9. The communication apparatus according to claim 8, wherein the frame controlling means generates the plurality of identical frames when the frame controlling means receives the representative frame.

10. A communication system for communicating speech and data, the system comprising:

a telephone switching system;

a network connecting device for performing a connecting process between networks; and a communication apparatus, connected to at least one of an office telephone interface line of the telephone switching system, an office data interface line of the network connecting device, and an interoffice trunk line, the communication apparatus comprising:

input processing means for storing and managing at least one of three types of frames which include speech frames carrying speech signals, data frames carrying data signals, and integrated frames carrying both speech and data signals, frame controlling means for integrating the speech frames, and data frames, into the integrated frames and performing routing control of the speech frames, data frames, and integrated frames, the integrated frame allowing the speech frame therein to occupy as much bandwidth as required while assigning the remaining bandwidth to the data frame, the data frame containing a plurality of packets to each of which QOS priority is set, and output processing means for storing and transmitting the frames routed by said frame controlling means, while dynamically setting a bandwidth ratio therefore.

11. The communication system according to claim 10, wherein the frame controlling means generates the integrated frames by causing the speech frames to occupy bandwidth which the speech frames use and assigning the rest of the bandwidth to the data frames.

12. The communication system according to claim 10, wherein the frame controlling means generates the integrated frames by creating priority information fields for the data frames in which high priority corresponds to connection-mode communication and low priority corresponds to connectionless-mode communication.

13. The communication system according to claim 10, wherein the frame controlling means generates the integrated frames by creating an information field for controlling common line signals.

14. The communication system according to claim 10, wherein the input processing means has two storage areas and stores the frames by switching the storage areas every cycle.

15. The communication system according to claim 10, wherein the frame controlling means performs the routing control and a switching transfer of the frames to the output processing means on the basis of information regarding the frames.

16. The communication system according to claim 10, wherein the frame controlling means performs the routing control and generates transfer scheduling information, on the basis of information regarding frames.

17. The communication system according to claim 16, wherein the input processing means transfers the frames to the output processing means on the basis of the transfer scheduling information.

18. The communication system according to claim 10, wherein the output processing means generates and outputs one representative frame when the data frames transferred include identical frames.

19. The communication system according to claim 18, wherein the frame controlling means generates the plurality of identical frames when the frame controlling means receives the representative frame.

20. A method for integrating speech and data for communicating by integrating and controlling speech and data, the method comprising the steps of:

storing, and managing at least one of three types of frames which include speech frames carrying speech signals, data frames carrying data signals, and integrated frames carrying both speech and data signals;

integrating the speech frames and data frames into the integrated frames and performing routing control of the speech frames, data frames, and integrated frames, wherein each integrated frame allows the speech frame integrated therein to occupy as much bandwidth as required, while assigning the remaining bandwidth to the data frame therein, and wherein the data frame containing a plurality of packers to each of which QOS priority is set; and storing and transmitting the frames routed by said frame controlling means, while dynamically setting a bandwidth ratio therefore.

21. The method for integrating speech and data according to claim 20, wherein the integrated frames are generated by causing the speech frames to occupy bandwidth which the speech frames use and assigning the rest of the bandwidth to the data frames.

22. The method for integrating speech and data according to claim 20, wherein the integrated frames are generated by creating priority information fields for the data frames in which high priority corresponds to connection-mode communication and low priority corresponds to connectionless-mode communication.

23. The method for integrating speech and data according to claim 20, wherein the integrated frames are generated by creating an information field for controlling common line signals.

24. The method for integrating speech and data according to claim 20, wherein the frames are stored as the input-side process by switching two storage areas every cycle.

25. The method for integrating speech and data according to claim 20, wherein the routing control is performed and a switching transfer of the frames is performed for the output-side process, on the basis of information regarding the frames.

26. The method for integrating speech and data according to claim 20, wherein the routing control is performed and transfer scheduling information is generated, on the basis of information regarding the frames.

27. The method for integrating speech and data according to claim 26, wherein the frames are transferred as the input-side process for the output-side process on the basis of the transfer scheduling information.

28. The method for integrating speech and data according to claim 20, wherein one representative frame is generated and output as the output-side process when the data frames transferred include identical frames.

29. The method for integrating speech and data according to claim 28, wherein the plurality of identical frames are generated if the representative frame is received at the time of the routing control.

* * * * *